United States Patent
Liu et al.

(10) Patent No.: US 8,424,751 B2
(45) Date of Patent: *Apr. 23, 2013

(54) EMBEDDED MEDIA BARCODE LINKS AND SYSTEMS AND METHODS FOR GENERATING AND USING THEM

(75) Inventors: Qiong Liu, Milpitas, CA (US); Chunyuan Liao, Mountain View, CA (US); Lynn Wilcox, Palo Alto, CA (US); Anthony Dunnigan, Palo Alto, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/855,253

(22) Filed: Aug. 12, 2010

(65) Prior Publication Data

US 2012/0037695 A1 Feb. 16, 2012

(51) Int. Cl.
*G06F 17/00* (2006.01)
*G06K 19/06* (2006.01)

(52) U.S. Cl.
USPC .................. 235/375; 235/462.01; 235/494

(58) Field of Classification Search .................. 235/375, 235/383, 385, 462.01–462.09, 494
See application file for complete search history.

(56) References Cited

U.S. PATENT DOCUMENTS

| | | | | |
|---|---|---|---|---|
| 6,892,947 | B1* | 5/2005 | Jam et al. .................. | 235/462.01 |
| 7,774,705 | B2* | 8/2010 | Erol et al. .................. | 715/719 |
| 2003/0229857 | A1* | 12/2003 | Sayuda et al. .................. | 715/517 |
| 2005/0067489 | A1* | 3/2005 | Jones et al. .................. | 235/380 |
| 2005/0161515 | A1* | 7/2005 | Lubow .................. | 235/494 |
| 2005/0213153 | A1* | 9/2005 | Hull et al. .................. | 358/1.18 |
| 2007/0050411 | A1* | 3/2007 | Hull et al. .................. | 707/104.1 |
| 2008/0005269 | A1* | 1/2008 | Knighton et al. .................. | 709/217 |
| 2008/0197192 | A1* | 8/2008 | Lindahl et al. .................. | 235/383 |
| 2009/0122351 | A1* | 5/2009 | Tsuchitoi .................. | 358/3.28 |
| 2010/0205537 | A1* | 8/2010 | Knighton et al. .................. | 715/751 |
| 2010/0288828 | A1* | 11/2010 | Pradhan et al. .................. | 235/375 |

OTHER PUBLICATIONS

B. Herbert et al., Speeded-Up Robust Features (SURF), Sep. 10, 2008, pp. 346-359, vol. 110, No. 3, Computer Vision and Image Understanding (CVIU).
B. Erol et al., HOTPAPER: Multimedia Interaction with Paper using Mobile Phones, Oct. 27-Nov. 1, 2008, pp. 399-408, In Proceedings of ACM Multimedia'08, Vancouver, Canada.
Pixazza—How it Works, http://www.pixazza.com/how-it-works/, (Retrieved 2010.).

(Continued)

*Primary Examiner* — Tuyen K Vo
(74) *Attorney, Agent, or Firm* — Sughrue Mion, PLLC

(57) ABSTRACT

Embedded Media Barcode Links (EMBL), are optimally blended iconic barcode marks printed on paper documents that signify the existence of media associated with that part of the document. EMBLs are used for media retrieval with a camera phone. Users take a picture of an EMBL-signified document patch using a cell phone, and the media associated with the EMBL-signified document location is displayed on the phone. Unlike traditional bar code which requires an exclusive space, EMBLs are optimally blended with contents and thus have less interference with the original document layout and can be moved closer to a media associated location. Unlike Embedded Media Makers (EMM) which requires underlying document features for the marker identification, EMBL has no requirement to underlying features. Moreover, EMBL can take the advantage of users' knowledge to traditional barcode. Retrieval of media associated with an EMBL is based on the barcode identification of the captured EMBL.

20 Claims, 21 Drawing Sheets

OTHER PUBLICATIONS

J. Hare et al., MapSnapper: Engineering an Efficient Algorithm for Matching Images of Maps from Mobile Phones, 2008, Proceedings of Multimedia Content Access: Algorithms and Systems II.

Q. Liu et al., Embedded Media Markers: Marks on Paper that Signify Associated Media, Feb. 7-10, 2010, pp. 149-158, ACM, Hong Kong, China.

N. Henze, S. Boll, Snap and Share Your Photobooks, Oct. 26-31, 2008, pp. 409-418, In Proceedings of ACM Multimedia'08, Vancouver, Canada.

J. Hull et al., Paper-Based Augmented Reality, 2007, pp. 205-209, Proceedings of IEEE ICAT.

Q. Liu et al., High Accuracy and Language Independent Document Retrieval With a Fast Invariant Transform, 2009, pp. 386-389, In Proceedings of IEEE ICME'09.

X. Liu, D. Doermann, Mobile Retriever Access to Digital Documents from their Physical Source, 2008, pp. 19-27, Institute for Advanced Computer Studies, College Park, USA.

D. Lowe, Distinctive Image Features from Scale-Invariant Keypoints, 2004, pp. 91-110, Int. J. Comput. Vision, Vancouver, Canada.

T. Nakai, et al., Use of Affine Invariants in Locally Likely Arrangement Hashing for Camera-Based Document Image Retrieval, 2006, pp. 541-552, Springer-Verlag Berlin Heidelberg.

T. Parikh, et al., Mobile Phones and Paper Documents: Evaluating a New Approach for Capturing Microfinance Data in Rural India, Apr. 22-27, 2006, pp. 551-560, Proceedings of ACM CHI'06, Montreal, Canada.

J. Rekimoto, Y. Ayatsuka, CyberCode: Designing Augmented Reality Environments with Visual Tags, 2000, pp. 1-10, In Proceedings of ACM DARE.

M. Rohs Real-World Interaction with Camera-Phones, pp. 74-89, vol. 3598, LNCS.

Y. Ke, R. Sukthankar, PCA-SIFT: A More Distinctive Representation for Local Image Descriptors, 2004, Proceedings of IEEE CVPR.

D. Hecht, Printed Embedded Data Graphical User Interfaces, Mar. 2001, pp. 47-55, IEEE.

Wikipedia, Digital paper. http://en.wikipedia.org/wiki/Digital_paper, (Retrieved 2010).

D. Reilly et al., Marked-up maps: combining paper maps and electronic information resources, 2006, pp. 215-226, Personal and Ubiquitous Computing, Springer-Verlag, London.

E. Costanza, J. Huang, Designable Visual Markers, Apr. 4-9, 2009, pp. 1879-1888, Proceedings of ACM CHI'09, Boston, USA.

N. Tsugio et al., Print-type Steganography Technology, Fujitsu, 2006, 320-324, vol. 57. No. 3, Japan.

A. Morrison et al., Like Bees Around the Hive: A Comparative Study of a Mobile Augmented Reality Map, Apr. 4-9, 2009, pp. 1889-1898, In Proceedings of ACM CHI '09, Boston, USA.

Microsoft Tag. http://www.microsoft.com/tag/content/overview/, (Retrieved 2010).

Xerox DocuTech, http://www.cpedia.com/wiki/Xerox_DocuTech-?hit=37&source=38, (Retrieved 2010).

\* cited by examiner

1. The function that maps previous atten samples is given by -

$$s_{t+1} = f(a_t), t > 0$$

ar function of the form, $f(x) = \xi.x + \rho$,
stants. $\xi$ denotes a scaling factor and $\rho$ d
: in the region of attention.
ce *evaluation* is done by recording the cc
ll as the accuracy of the processing. The
d accuracy are compared with the existin;

1. The function that maps previous atten samples is given by -

$$s_{t+1} = f(a_t), t > 0$$

ar function of the form, $f(x) = \xi.x + \rho$,
stants. $\xi$ denotes a scaling factor and $\rho$ d
: in the region of attention.
ce *evaluation* is done by recording the cc
ll as the accuracy of the processing. The
d accuracy are compared with the existin;

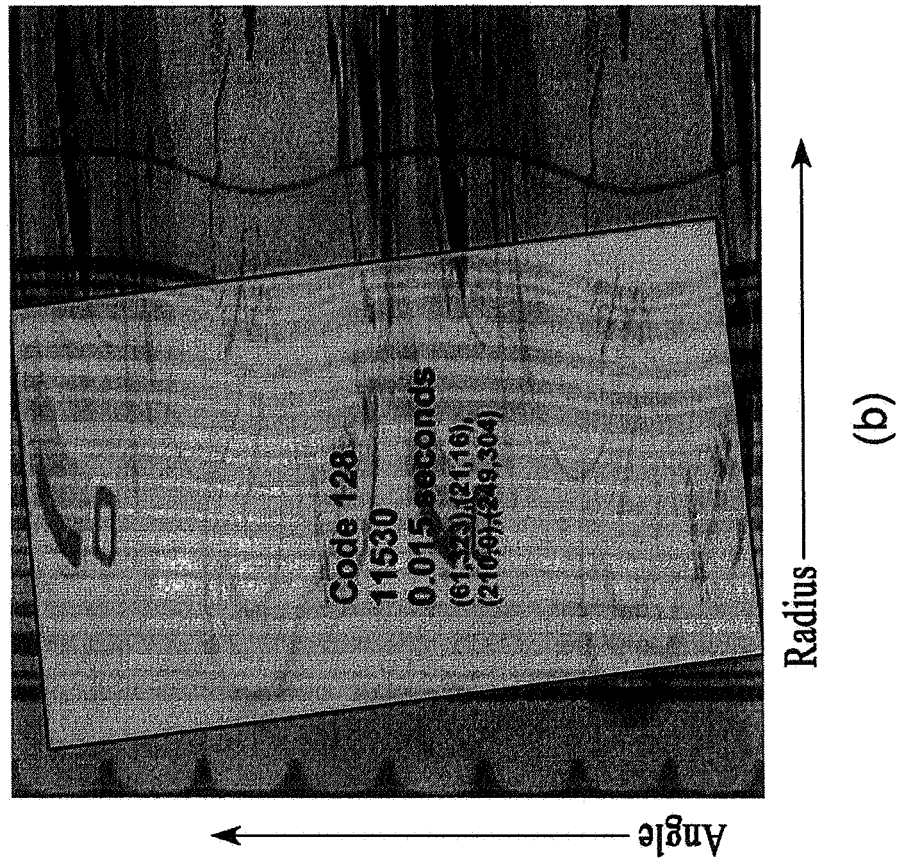
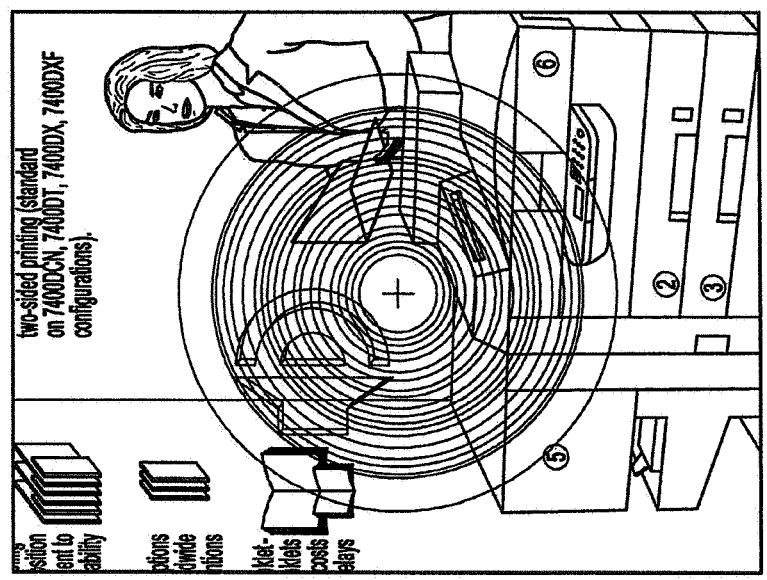
FIG. 17

EMBEDDED MEDIA BARCODE LINKS AND SYSTEMS AND METHODS FOR GENERATING AND USING THEM

BACKGROUND

1. Field of the Invention

This invention relates in general to embedded media markers, which signify the existence of media associated with a part of a document containing the embedded media marker, and specifically, to the use of embedded media barcode links.

2. Description of the Related Art

Although paper is one of the most widely used devices for viewing information, it cannot play dynamic media such as video and audio. On the other hand, cell phones are increasingly used to play audio and video but cannot match paper's high resolution, large display size, flexibility in spatial organization, outdoor-readability and robustness for static content. It is now possible to combine the two, using image recognition technology to link paper documents to corresponding dynamic media. A cell phone camera is used to capture an image of a document patch. The document patch is identified using features in the image, and digital media linked to that location in the document is retrieved and then played on the cell phone.

A common method for creating this type of media link on a paper document is to print markers on the document. One obvious example is bar code (Rekimoto, J. and Ayatsuka, Y., CyberCode: designing augmented reality environments with visual tags. In Proceedings of ACM DARE 2000, pp. 1-10.) However, existing barcode printing requires an exclusive space and thus may interfere with the document content layout. One solution that alleviates this issue is by merging data cells with the user-specified image background, which still requires an opaque black-white border for the decoder to locate the data cells. Data Glyphs (Hecht D. L., Embedded Data Glyph Technology for Hardcopy Digital Documents. SPIE-Color Hard Copy and Graphics Arts III, Vol. 2171, pp. 341-352.) overcome these problems by printing a nearly invisible machine-recognizable pattern on the paper. However, this type of marker requires high resolution printers and cameras to identify document locations. Electronic markers like RFID can be used too (Reilly, D., M. Rodgers, R. Argue, et al., Marked-up maps: combining paper maps and electronic information resources. Personal and Ubiquitous Computing, 2006. 10(4): pp. 215-226.), but this approach increases the production costs.

Other systems compute features of the document content itself for identifying the document patch and thus creating a media link. HotPaper (Erol, B., Emilio Antunez, and J. J. Hull. HOTPAPER: multimedia interaction with paper using mobile phones. In Proceedings of ACM Multimedia'08, pp. 399-408.) and Mobile Retriever (Liu, X. and D. Doermann, Mobile Retriever: access to digital documents from their physical source. Int. J. Doc. Anal. Recognit., 2008. 11(1): pp. 19-27) use features based on document text such as the spatial layout of words. Other systems such Bookmarkr (Henze, N. and S. Boll. Snap and share your photobooks. In Proceedings of ACM Multimedia'08, pp. 409-418) and MapSnapper (Hare, J., P. Lewis, L. Gordon, and G. Hart. MapSnapper: Engineering an Efficient Algorithm for Matching Images of Maps from Mobile Phones. Proceedings of Multimedia Content Access: Algorithms and Systems II, 2008) use pixel level image features, such as the SIFT algorithm (Lowe, D. G., Distinctive Image Features from Scale-Invariant Keypoints. Int. J. Comput. Vision, 2004. 60(2): pp. 91-110.), to recognize generic document content such as pictures and graphic elements. With these systems, exclusive spaces are not required for marker printing.

Both marker-based methods and document-appearance-based methods fall short in providing visual guidance for users. Although bar codes and Data Glyphs are visible, they do not directly indicate the existence or type of media associated with them. When appearance-based feature are used, there is no on-paper indication at all to the user that there is media linked to the document. As a result, a HotPaper user has to pan a camera phone over the paper document to look for hotspots until feedback such as a red dot or vibration is presented on the cell phone.

To solve this problem, researchers augment paper with meaningful awareness-mark, called EMM (Liu, Q., Liao, C., Wilcox, L., Dunnigan, A., and Liew, B. 2010. Embedded media markers: marks on paper that signify associated media. In *Proceeding of the 14th international Conference on intelligent User interfaces* (Hong Kong, China, Feb. 7-10, 2010). IUI '10. ACM, New York, N.Y., 149-158), which indicate the existence, type, and capture guidance of media links. On seeing an EMM, the user knows to capture an image of the EMM-signified document patch with a cell phone in order to view associated digital media. This is analogous to Web pages that use underlines, font differences, or image tags to indicate the existence of links that users then click for additional information. Unlike barcodes, EMMs are nearly transparent and thus do not interfere with the document appearance. Unlike Embedded Data Glyphs or Anoto patterns found in Digital Paper, EMMs can be printed with a regular low-resolution printer and identified from an image captured by a normal cell phone camera. Unlike other appearance-based approaches, EMMs clearly indicate signified document patches and locations. The design of EMMs also indicates what type of media (e.g. audio, video, or image) is associated with the EMM-signified document location. Furthermore, by requiring the captured image to cover the whole mark, the EMM system can improve feature construction accuracy, matching accuracy, and efficient resource usage.

EMM solves many past problems. However, the EMM patch identification is slower than traditional barcode. It also requires the underlying document has enough features for patch identification. Additionally, the scalability and error correction ability test for EMM is still not available. Moreover, some barcode users may doubt the clean document patch has enough information to link to associated media.

SUMMARY

Various embodiments of the inventive methodology are directed to methods and systems that substantially obviate one or more of the above and other problems associated with conventional techniques related to embedded media markers.

In accordance with one aspect of the present invention, there is provided a computer-implemented method for providing a digital medium by making use of an embedded media barcode link and an article. The embedded media barcode link may include a barcode. The method may involve receiving an image of an embedded media barcode link on the article; extracting information from the embedded media barcode link; identifying embedded digital media corresponding to the extracted information; and retrieving the identified embedded digital media.

Additional aspects of the present invention include an article. The article may include content visualized on a surface of the article; an embedded media barcode link blending (for example, mixing in document page space and gray level)

the visualized content, the embedded media barcode link comprising a barcode; and an embedded digital media object corresponding to the embedded media barcode link, the embedded digital media object being stored in a database.

Additional aspects of the present invention include a computer-implemented method for producing an article including visualized content and an embedded media barcode link on the content. The embedded media barcode link may include a barcode. The method may involve receiving a selection of a location on the visualized content of the article; determining a position and size of the embedded media barcode link based on a quantity of a plurality of features of the visualized content near the selected location within the embedded media barcode link; and positioning the embedded media barcode link on the article based on the determined position, shape, barcode-type and size, wherein the embedded media barcode link indicates availability of a digital media object associated with the location within the visualized content.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify embodiments of the present invention and, together with the description, serve to explain and illustrate principles of the inventive technique. Specifically:

FIGS. 12-15 illustrate examples of blending a barcode and contents with various blending coefficients.

FIGS. 17(a) and 17(b) illustrate an example EMBL being made into known form curves instead of barcode form according to an embodiment of the invention.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of software running on a general purpose computer, in the form of a specialized hardware, or combination of software and hardware.

To compensate existing media linking issues, a new and novel media awareness mark, called Embedded Media Barcode Link (EMBL), is proposed. EMBL is a semi-transparent media-icon-modified barcode overlay on paper document content for linking to associated media.

Figure 1:
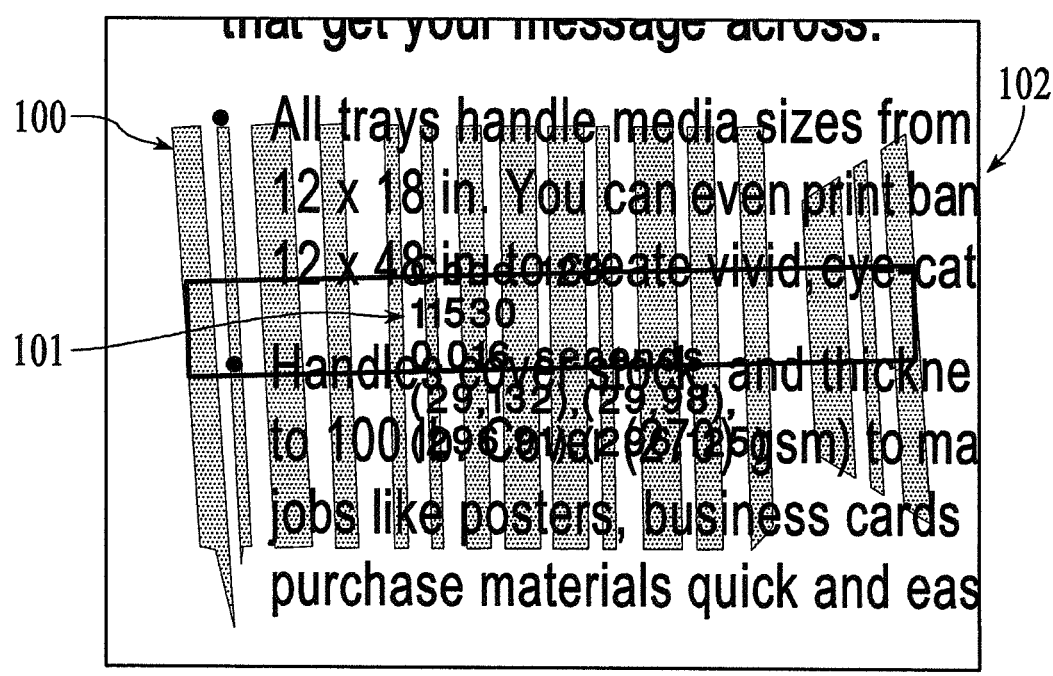
FIG. 1 illustrates one exemplary embodiment of the Embedded Media Barcode Link (EMBL).

FIG. 1 illustrates a recognized EMBL according to an embodiment of the invention. Unlike traditional barcodes, EMBLs are semi-transparent 101 and thus have less interference with the document appearance. Unlike the aforementioned Embedded Data Glyphs or Anoto patterns, EMBLs can be printed with a regular low-resolution printer and identified from an image captured by a normal cell phone camera. It can also indicate the existence, type, and capture guidance of media links. On seeing an EMBL, users would naturally associate it with a traditional barcode so that it will be easier for them to apply barcode capturing techniques to EMBL. Since EMBLs use the same decoding scheme as barcodes, scalability and error correction abilities are also supported. EMBLs can also work on documents that do not have many features, such as a blank page with one or two text lines. Such a situation would be difficult case for EMMs. Although EMBLs are still more intrusive than EMMs, the advantages, especially in situations that are difficult for EMMs, outweigh this problem. In this example, the identified barcode information of the EMBL is overlaid 101 on a captured image 102 after the EMBL is identified.

Embodiments of the EMBL include a semi-transparent media-icon-modified barcode overlay on paper document content for linking to associated media. It may use an 'EMBL-signified document location' to define the precise location for media association. An EMBL may use a semi-transparent form to reduce interference to document content and move closer to EMBL signified location. It may further use a semi-transparent barcode to identify signified document patches for camera capture, and also may use iconic information to reveal associated-media information. The form of an EMBL can be horizontal, diagonal, vertical, or circular.

FIGS. 2(a) and 2(b) show two EMBL examples. In these examples, EMBL uses an iconic mark 200 to reveal information of the linked media type. It also uses an arrow to signify the accurate location for the media link 201.

EMBL Construction Examples

Figure 3:
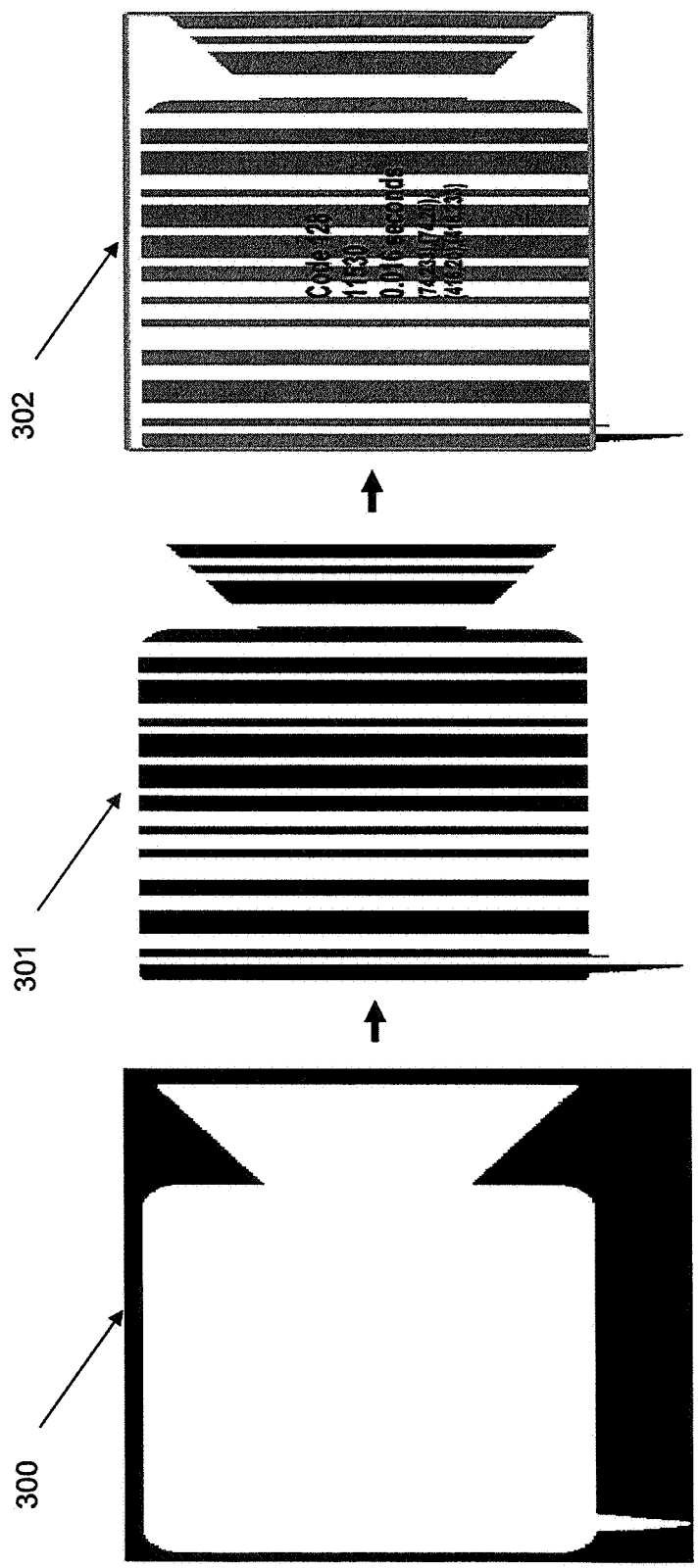
FIG. 3 illustrates the process for modifying the EMBL outline according to an embodiment of the invention.

The barcode outline modification may be achieved by masking an existing barcode with an icon mask. FIG. 3 illustrates the process for modifying the EMBL outline according to an embodiment of the invention. In this process, a black and white media icon is created as a media icon mask 300. In this example, a video icon is used. Then, the barcode is masked with the icon 301 so that the barcode extension pattern changes with the media icon envelop. Optionally, the masked barcode is also verified with the barcode decoder 302.

Figure 4:
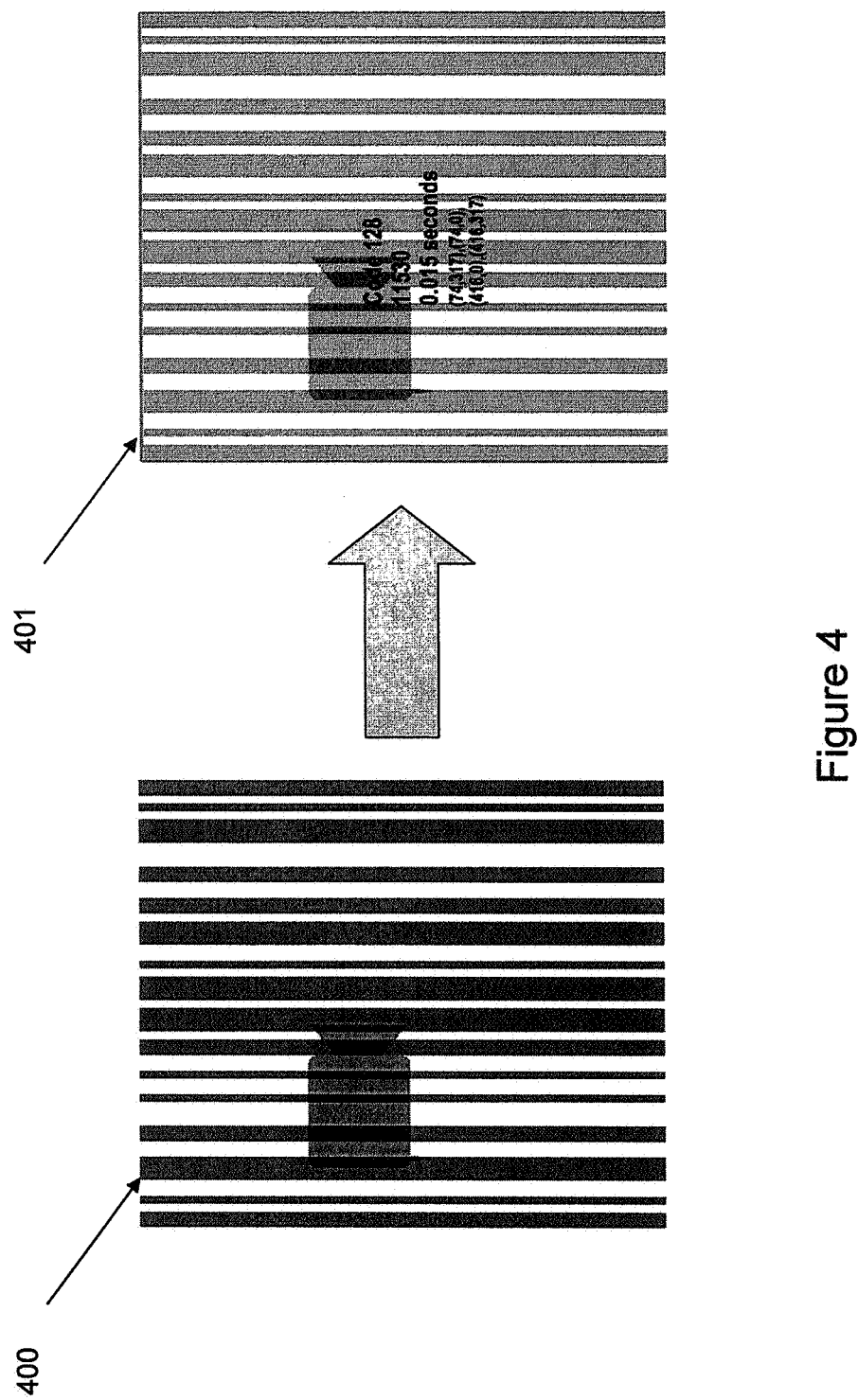
FIG. 4 illustrates a media icon being alpha-blended directly with a barcode to generate an EMBL according to an embodiment of the invention.
Figure 5:
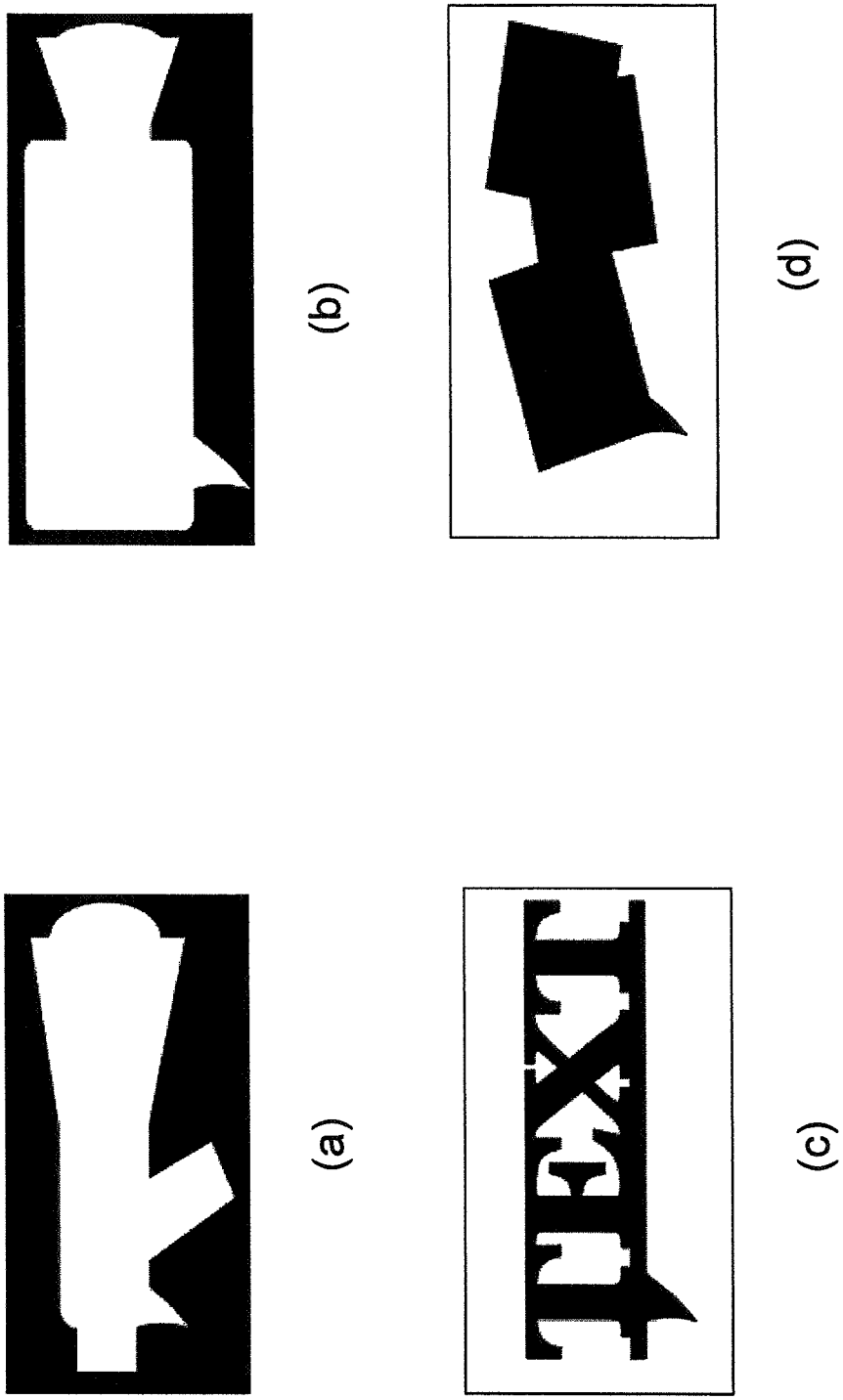
FIGS. 5(a)-(d) illustrates example of other EMBL shapes that can be considered according to embodiments of the invention.

The media icon may also be alpha-blended directly with a barcode to generate an EMBL. FIG. 4 illustrates the generation of this type of EMBL 400. The EMBL base form (without document content blending) is verifiable 401 with a barcode decoder. FIGS. 5(a)-(d) show some other EMBL shapes that can be considered.

The most significant difference between an EMBL and a traditional barcode is the marker's transparency. Traditional barcode standards are machine oriented standards. More specifically, they only consider the barcode itself and the barcode devices. The EMBL design tries to consider user, document, and barcode all together, and every EMBL mark is a proper barcode-content blending that can benefit users and documents most without losing barcode advantages.

To facilitate readers' understanding to document contents as well as barcode overlay identification, the cross-talk needs to be minimized between the barcode signal and the content signal. Previous research utilized invisible toner for barcodes so that the content signal and barcode signal use different light spectrums. Even though that approach is good for reading and barcode decoding, it completely eliminates the visual cue for a user to initialize user-paper interaction. Moreover, it requires printer modification and special invisible toner to support applications of that technology.

Using EMBL for Linking Multimedia to a Document Location

To link multimedia data to a paper document location, there should be a media maker at that location to differentiate the location from all other locations. It is better for the media marker to have following properties:

1. The marker should act as a prompt for a cell phone capture when a user is interested in the marker signified location.

2. By looking at the marker, it should be easy for a user to figure out the marker capture guidelines, and gain confidence for a capture.

3. To attract user interest, information of the linked multimedia data may be provided.

4. The marker may be placed close to the paper document location so that it is easy for a user to figure out where the multimedia is linked to.

5. The marker identification speed should be fast to ensure a short waiting time.

6. The marker should be very distinctive to ensure multimedia retrieval accuracy.

7. The marker should be scalable if users need to use it for a large portion of the document.

8. The marker should not need to depend too much on document features so that it can be used to handle most document regions including nearly blank regions. Moreover, this property may also help a machine to distinguish the same image used in different scenarios.

9. The marker should not significantly interfere the original document contents and layout.

10. The marker identification process should not demand too much disk, memory, and computational cost.

In this list, the 1-$7^{th}$ requirements are proposed for improving user experience, the 8-$9^{th}$ requirements are proposed for benefiting the readability of original document, and the $10^{th}$ requirement is proposed for reducing hardware and energy cost for a large scale system. With these requirements in mind, the EMBL design is aimed to satisfy most of these requirements. Since many users are familiar with barcode and barcode capture with a cell phone, the semi-transparent barcode outlook of EMBL is a good prompt for cell phone capture and a good icon for generating usage confidence in general public. The EMBL shape provides media type information to users. Because of its semi-transparent form, it is easy to move an EMBL close to any media associated location without changing the original document layout. Because the EMBL decoding is similar to barcode decoding, the decoding accuracy, speed, and scalability are verifiable by many early barcode applications. Also because of the semi-transparent form, an EMBL mark has less interference to the original document contents and layout than a traditional barcode. Its hardware cost is also well known and affordable to most applications.

Problem Abstraction for Blending Barcode with Contents

For patch identification purposes, the visible barcode blended with document contents can be identifiable by a barcode identification machine. This barcode printing and identification process may be modeled as a communication process where each document patch is considered as a communication channel, embedded barcode is considered as transmitted signal, and document contents and iconic marks are considered as noises for the signal transmission. With this model in mind, algorithms can be designed to find a proper channel in a user selected neighborhood for the barcode transmission with proper content-barcode blending. The barcode-content blending process enables us to adjust the channel capacity of a document patch. With a reasonably high channel capacity, a high barcode identification rate can be ensured. This model is used in our EMBL authoring tool for finding a proper barcode-printing document patch with a proper barcode-content blending coefficient. It can also be used for EMBL optimization over barcode type.

EMBL Authoring Tool

From a user's aspect, when a document editor wants to blend a barcode signal with document contents at a certain location, it is hard for a document editor to achieve an optimal blending. To facilitate EMBL creation, an EMBL authoring tool is designed that can semi-automatically arrange EMBL based on 'noise' distribution in a neighborhood. We set three criteria for the authoring tool:

The tool should minimize document editor's effort. More specifically, the authoring tool only requests an EMBL author point for each EMBL generation.

The tool should minimize the EMBL interference to document. More specifically, we want the tool to minimize, or find the best barcode blending coefficient of the EMBL.

The tool should minimize channel noise. More specifically, the tool should be able to find the document patch with lowest 'noise' around an anchor point for reliable barcode communication.

EMBL Optimization Parameters and Mechanisms

The EMBL optimization starts with an anchor point (m,n) input from a document editor. This can be done with a mouse-click on the editing interface. The anchor point is the point to which the editor wants to associate the linked media. After the authoring tool get the anchor point input, it will try to find the best EMBL parameters for the anchor point.

The EMBL authoring should minimize the EMBL interference to the original document. Denoting the barcode image with $I_B$, the original document image with $I_C$, the barcode blending coefficient with $I_B$, and the blended image with $I_{BC}$, the barcode blending process can be described with the following equation:

$$I_{BC} = \alpha \cdot I_B + (1-\alpha) \cdot I_C \quad (1)$$

To make the original document $I_C$ more visible to users, the blending coefficient $\alpha$ should be as small as possible. However, $\alpha$ should be large enough for reliable barcode recognition. Denote the barcode decoding process with D, we can get the EMBL optimal blending coefficient $\alpha^*$ at a fixed pose with the following equation:

$$\alpha^* = \min_{D(I_{BC}(\alpha))=D(I_B)} (\alpha) \quad (2)$$

Figure 2:
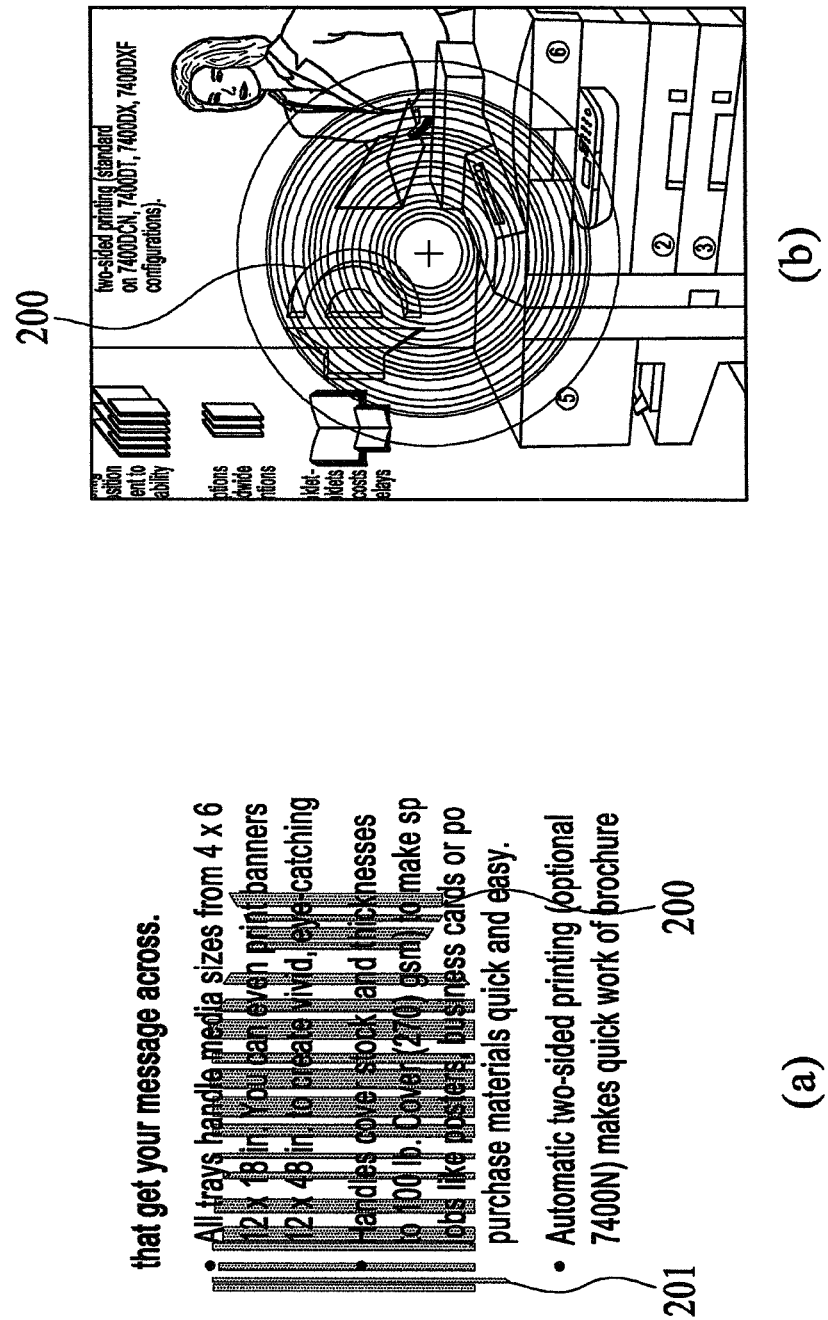
FIGS. 2(a) and 2(b) show two EMBL examples according to embodiments of the invention.

If the authoring tool is given more choices for EMBL optimization, the tool may also change $I_C$ (corresponding to barcode transmission channel selection), and $I_B$ (corresponding to barcode transmission signal base selection). The EMBL placement parameters depend on the type of EMBL we use. If linear barcodes are used as shown in FIG. 2 (a), the authoring tool only needs five parameters for the EMBL placement. These five parameters include 2 parameters for the EMBL placement origin (x,y), one parameter for the EMBL scale λ, and two parameters for the EMBL placement orientation (u,v) on the paper surface. The $I_B$ change depends on the barcode-type set $S_B$ if the system does not have the freedom to change the encoded data. With these EMBL adjusting parameters, the equation 3 will be changed to:

$$\alpha^* = \min_{D(I_{BC}(\alpha,I_C(x,y,u,v,\lambda),I_B(S_B)))=D(I_B(S_B))} (\alpha) \quad (3)$$

For further simplification, the barcode base set $S_B$ can be fixed to code-128 only, along with fixing the linear barcode orientation with bars perpendicular to the document regular line direction, and fixing the barcode size. With these parameters only optimization over α, x and y needs to be conducted. Through understanding of the optimization over α, x and y, it is not difficult to conduct optimization over more parameters.

Blending coefficient optimization at a fixed location according to equation 2 can be performed by adjusting barcode blending parameters according to equation 1 and feeding the blended document patch to a barcode decoder for verification. The optimization will be time consuming if the blending coefficient is changed with small steps during the optimization. To reduce the computation cost, the larger blending coefficient α (darker barcode blending) can be assumed to lead to better barcode identification. With this assumption, a binary search can be formed of the optimal blending coefficient and the optimization can be stopped when the search interval is smaller than a predefined threshold.

The binary search mechanism only saves computation for blending coefficient optimization. Optimizing blending coefficient at every possible location (x,y) is still time consuming. For example, if the barcode detection time is 15 ms and 8 intervals need to be tried during the binary search for good blending coefficient accuracy, then the blending coefficient search will cost 120 ms for each location. 120 ms is not a long time for the whole application.

However, 120 ms is a long time if this optimization is attempted at every possible location (x,y) in a neighborhood. Because it cannot be assumed that the 'barcode on the right is always better than barcode on the left', binary search to speedup the optimization over EMBL locations cannot be used. However, this optimization may be simplified with guidance from the Shannon-Hartley theorem and a proper noise model.

Equation 4 is the mathematical form of the Shannon-Hartley theorem:

$$C = B\log_2\left(1 + \frac{S}{N}\right) \quad (4)$$

where C is the channel capacity, B is the channel bandwidth, S is the signal magnitude, and N is the noise magnitude. Guided by this theorem, the system can get a reasonable barcode identification rate if the communication channel's signal-to-noise-ratio (SNR) is over a certain limit. The document patch (channel) with the lowest channel noise around an EMBL signified-location for barcode transmission with minimum magnitude (maximum transparency and least interference to document) can thereby be searched. Optimization can further be conducted on the barcode transmission over document contents (channel noise) as well as barcode types (signal transmission bases).

Noise Models

Because the transmission signal (barcode) in the optimization problem is known, the optimization over SNR becomes an optimization problem over noise. Since document contents normally harm the barcode recognition after barcode-content blending, document contents are considered as noise in our noise estimation process.

Figure 6:
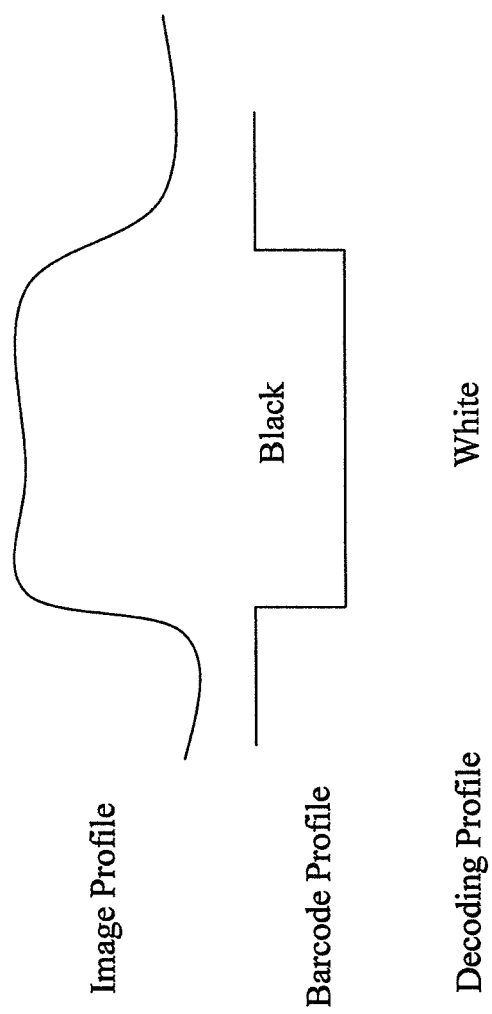
FIG. 6 illustrates an example impact of an edge in a document content to a barcode decoding.

FIG. 6 illustrates the impact of an edge in a document content to a barcode decoding. In this example, improper blending caused errors in decoding. To perform optimization over noise, we should have proper noise models for noise estimation. Since normal linear barcode mainly use high frequency spectrum for data encoding, the DC and very low frequency signal has very little impact to barcode transmission. On the other hand, because many barcodes have directions on paper, the SNR changes over directions. Therefore, directional noise models are needed for the optimization over noises. Currently, there are three noise models in our mind:

1. The first model for noise estimation is gradients of document content. This model suppresses low-frequency content components that do not have much impact to the barcode transmission. The gradient noise model can be directional (compute gradients in a certain direction), or omni-directional (combined gradients in all directions).

2. The second model for noise estimation is based on feature points, such as SIFT feature points. In theory, these feature points are distinguished gradient points. This model can also be directional or omni-directional depending if the system considers the direction of each feature point.

3. The third model for noise estimation is based on edges at a certain scale (i.e. band-pass filtering the image). The insight of an edge is the projection of gradients in a certain direction.

This model is a directional model. The regular directions or this model are vertical, horizontal, or diagonal.

The noise estimation in an EMBL channel can be achieved by a summation of noise levels at all pixels inside an EMBL channel.

Figure 7:
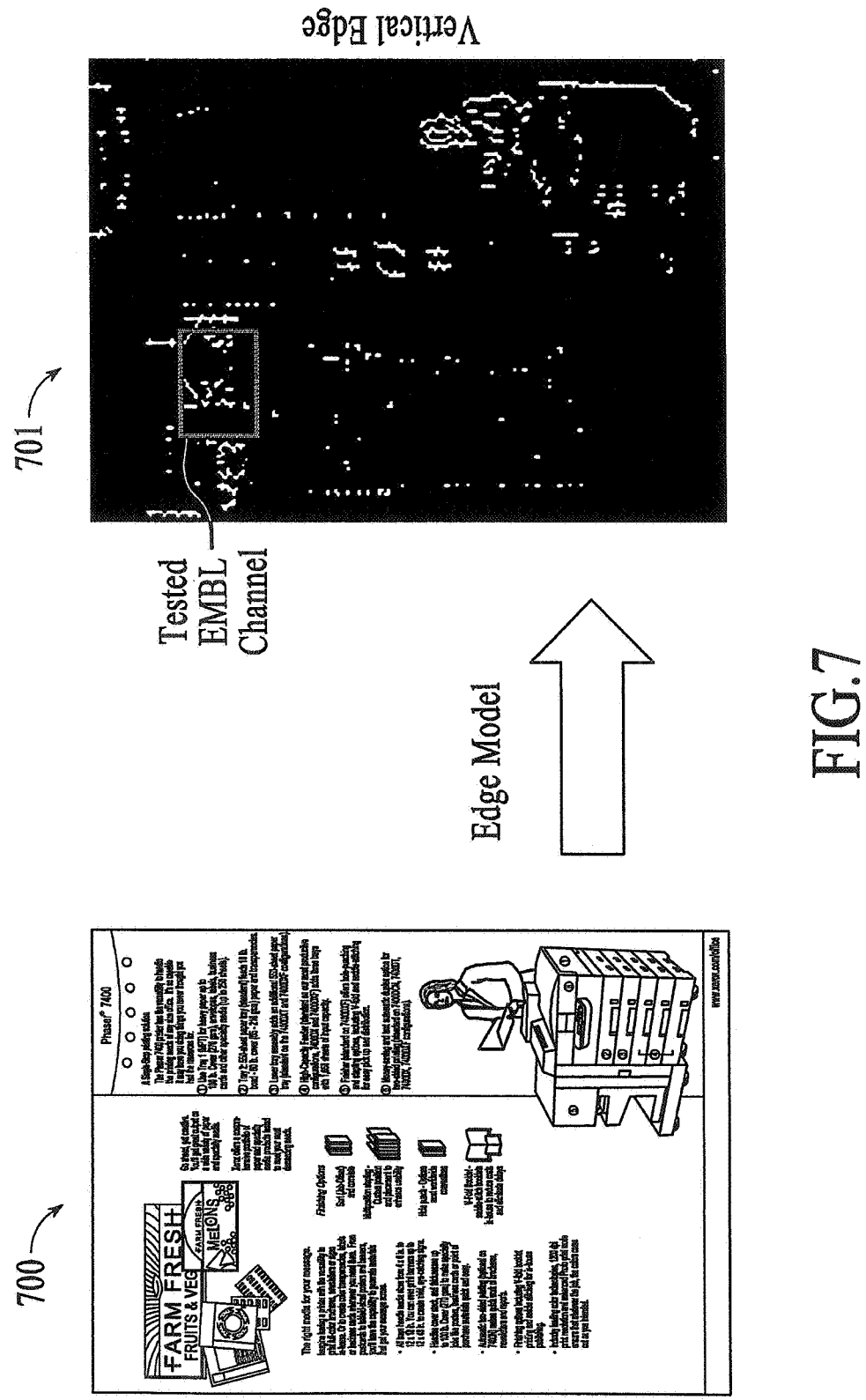
FIG. 7 gives an example for estimating noise in a tested EMBL channel.

FIG. 7 gives an example for estimating noise in a tested EMBL channel. In this figure, the left image 700 shows the original document, and the right image 701 shows vertical-edge-noise level of every pixel computed from the original image. If an EMBL is placed in the rectangular box in the right image 701; the noise estimation can be obtained by adding the noise level of every pixel in the rectangular box. With this noise estimation, the noise in one channel can be compared with noise in a different channel by moving the rectangular box to a different position and choosing a channel with low noise for the barcode transmission. A low noise channel normally needs a lesser barcode signal magnitude than a high noise channel to achieve the same barcode recognition rate, and a lesser barcode signal magnitude usually means less interference to the original document. From the edge maps, the algorithm clearly favors blank regions for the barcode overlay.

A Noise Estimation Example and Algorithm Speedup

A Feature-Point-Detector based noise estimation algorithm can be implemented in the following way:

1. Use 'Feature-point Detector' to construct a vertical edge map at proper scale depending on barcode bar width parameter.

2. After the anchor point is given, try every bounding box in the search range to find a barcode bounding box around the anchor point that includes minimum edge points.

In this optimization algorithm, because the edge point summation needs to go through all pixels, the bounding box searching process will use a large amount of time for a regular search range (e.g. 200 pixel vertical by 200 pixel horizontal). This problem can be solved by the use of an integral image map.

Figure 8:
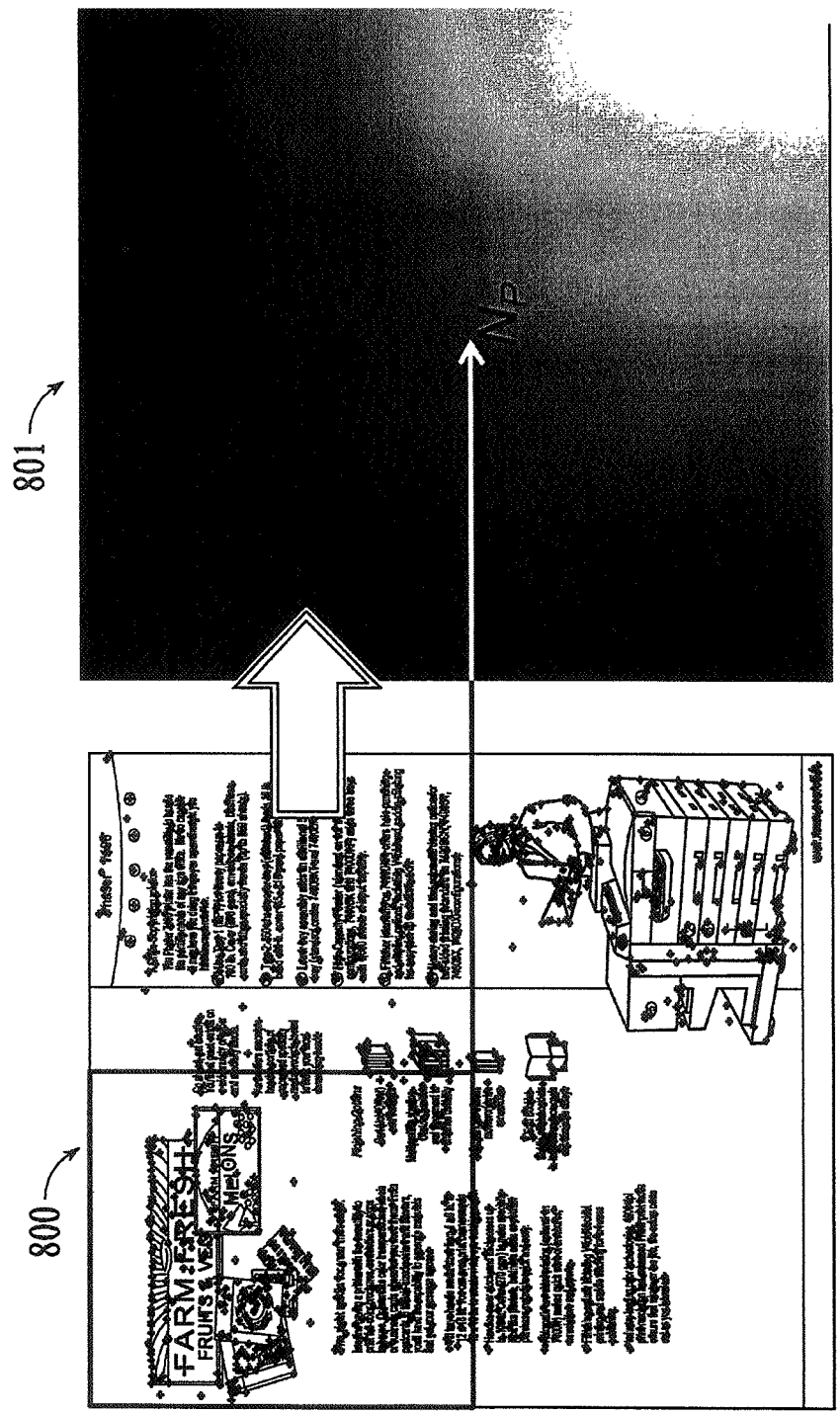
FIG. 8 illustrates a computation of a keypoint integral image map computed from the keypoint distribution map of an image according to an embodiment of the invention.

FIG. 8 illustrates the computation of a keypoint integral image map 801 computed from the keypoint distribution map of an image 800. The value $N_P$ of a pixel P in an integral image map is computed by adding all original pixel values in the rectangular box between the top-left image corner and P. The original noise value at every pixel in our problem can be gradient values at a pixel or key/edge-point counting value (1 if a pixel is a keypoint or an edge point and 0 if not.) Thus, the integral image map can be obtained 801. They keypoint distribution map can also be an edge point distribution map or a gradient value map.

Figure 9:
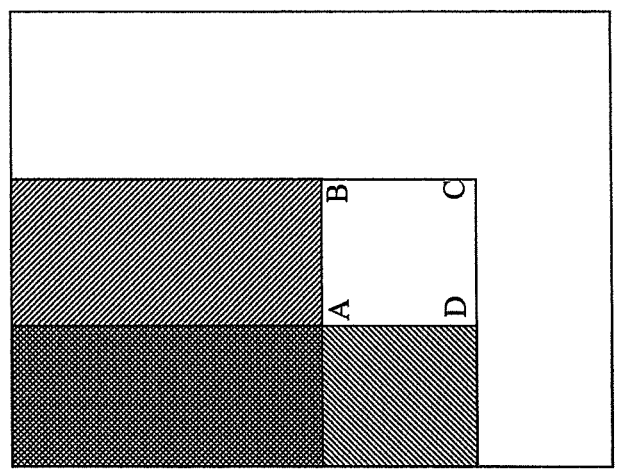
FIG. 9 illustrates the noise estimation speedup with an integral image map.

FIG. 9 illustrates the noise estimation speedup with an integral image map. In this figure, the estimated noise $N_{ABCD}$ in the rectangular box ABCD can be achieved with following equation:

$$N_{ABCD}=N_C-N_B-N_D+N_A \quad (5)$$

This equation allows us to estimate the noise level in a bounding box (a potential EMBL channel) with three operations. It is much cheaper in computation than going through all pixels in the bounding box. It is also much cheaper than optimizing blending coefficient at a certain location. Moreover, if we know the EMBL orientation and scale, we know the box size. With a known bounding box size, we can pre-compute the noise estimation in each bounding box and save more online computation time of the authoring tool.

EMBL Overlay Algorithm Design

By using the integral image map, we can have a speedup algorithm for EMBL overlay:

1. Use a 'Feature Point Detector' to construct a vertical edge map at proper scale depending on barcode line width parameter.

2. Construct vertical edge integral map.

3. After the anchor point is given, find a barcode bounding box around the anchor point that has minimum edge points in the vertical direction. Counting the number of edge points in a bounding box can be done with the edge integral maps.

4. Adjust barcode blending parameters and feed the blended document patch to a barcode decoder for verification. The optimal blending parameter can be found with a binary search of the blending coefficient.

Experiments

Because communications through regular document patch do expect less channel capacity than a dedicated barcode patch, an extremely large data encoding set was not used for testing. Instead 4 code-128 characters for each system-generated barcode were used for experimentation. According to the Code-128 definition, the total number of codes in all these experiments is around 100×100×100×100=100 million without considering the start and stopping code. This a reasonable scale for initial EMBL applications.

One major difference between the traditional barcode and EMBL is the blending coefficient. This blending coefficient exposes the chance for an intelligent agent (our optimization algorithm) to 'negotiate' with a barcode decoder for maximum user benefits and document benefits. Because of this negotiation, an EMBL can be moved close to an EMBL signified location and still get all barcode advantages. Also because of this negotiation, the original document layout and allocate extra space for barcode printing need not be changed. However, all these EMBL benefits come from a hidden assumption that enough benefits can be gained from adjusting the barcode blending coefficient. More specifically, small barcode blending coefficients for most EMBL are presumed to be obtainable such that that the EMBL is nearly transparent and has little interference with the original document. If the blending coefficient is close to 1.0, the original document patch at the EMBL location is nearly replaceable by a barcode, which will greatly affect users' understanding to the original document.

Blending Coefficient Distribution Testing

Figure 10:
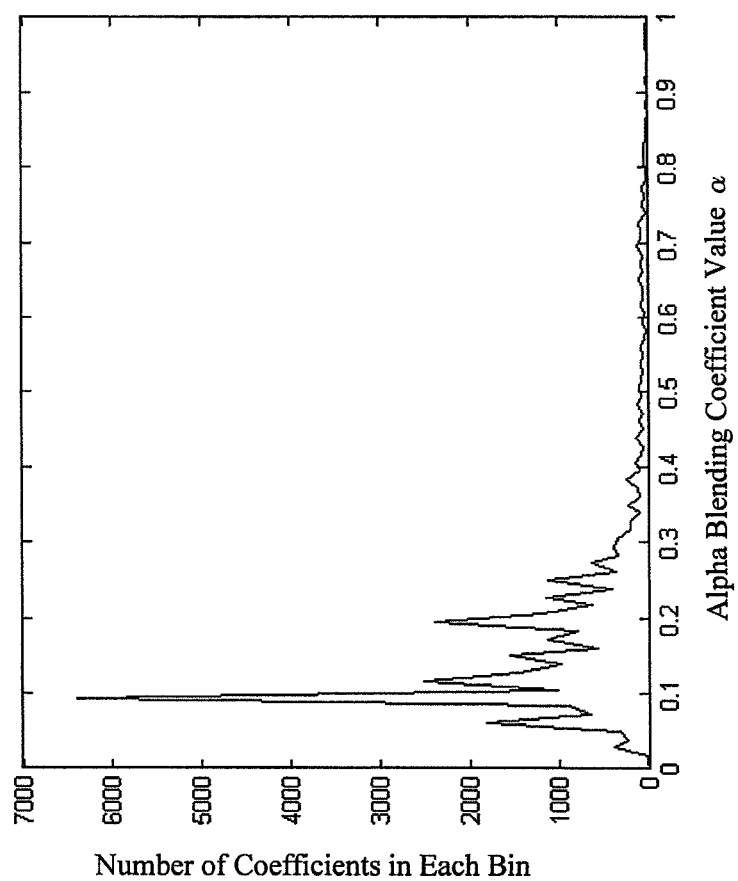
FIG. 10 shows an example distribution histogram of 33000 blending coefficients.

For the blending coefficient distribution testing, a document was used for an early stage performance evaluation of the EMBL design and construction algorithm. The document is a 2188 letter-size (8.5"×11") document pages with text, images, and figures. With the large page collection and content variation in the experiment, the test results should be reliable EMBL-performance evaluations for regular books. Because EMBL only uses a small patch in every document page, there are a large number of different EMBL communication channels in each page. Even though it is nearly impossible for to test all these channels, a good coefficient distribution estimation can be obtained if a large number of channels is randomly sampled. Base on this consideration, we randomly generate 33000 patch locations (x,y) in these 2188 pages and get optimal blending coefficients for these locations. To see the natural coefficient distribution in these channels, EMBL location optimization was not conducted around the neighborhood of these randomly selected locations. FIG. 10 shows the distribution histogram of these 33000 blending coefficients. However, if the larger blending coefficient leads to a better barcode identification than the smaller blending coefficient, the accumulated coefficient-distribution in FIG. 10 is obtained.

Figure 11:
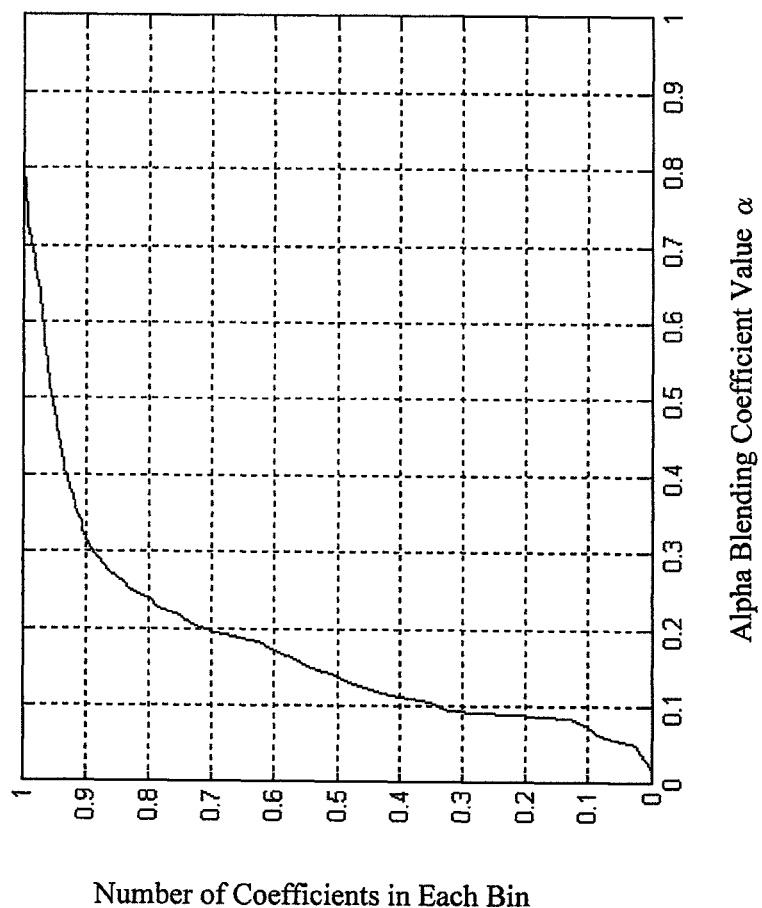
FIG. 11 illustrates the accumulated blending coefficient distribution of FIG. 10.

From the coefficient distribution in FIG. 10, the highest peak of the distribution is clearly at $\alpha=0.1$ and nearly all high peaks of the distribution are below α=0.25. From FIG. 11, around 90% channels clearly have a blending coefficient less than 0.3. Because a binary search approach is used to get optimal blending coefficients, blending coefficients do not have to exactly equal to 0.1 or 0.3.

Figure 13:
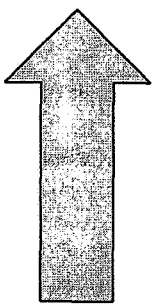

FIG. 12 shows an example of blending a barcode and contents with a 0.0977 blending coefficient. FIG. 13 shows an example of blending a barcode and contents with a 0.3008 blending coefficient. From these two examples, these blending coefficients clearly do not interfere much with a user's understanding of the original documents. These experimental results strongly support the correctness of our hidden assumption of the barcode blending coefficients. They also support the idea of optimizing blending coefficients.

Figure 14:
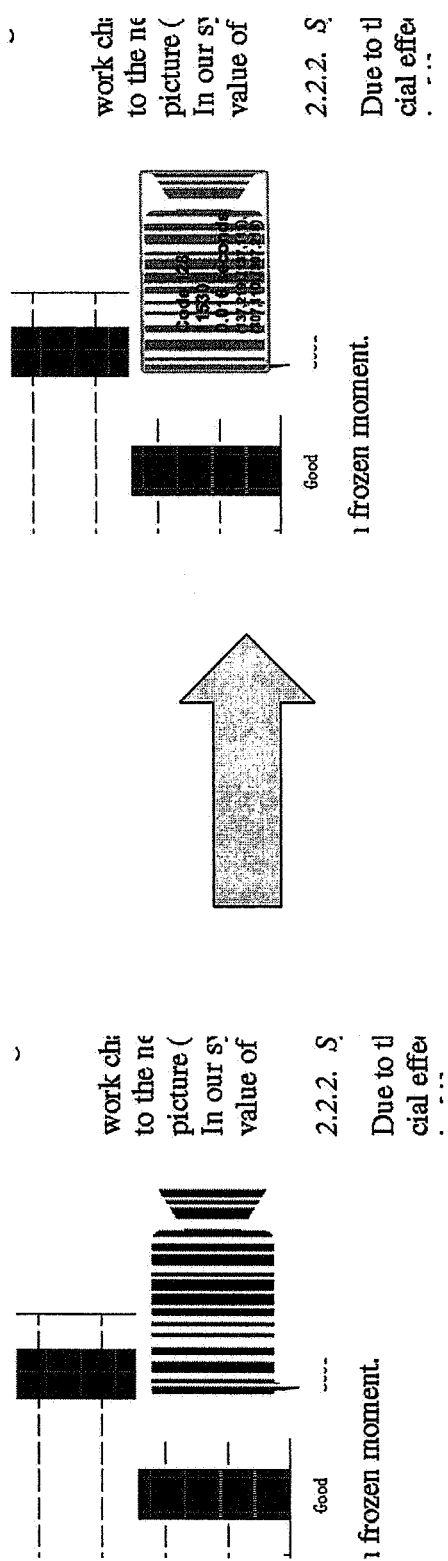

By further exploring the blending coefficient distribution, the smallest blending coefficient can be as small as 0.0273. Furthermore, the largest blending coefficient in this experiment is 0.9727. FIG. 14 shows the blending result with this largest blending coefficient. In FIG. 14, the barcode nearly occludes all of the content in the randomly selected patch. This would not be acceptable for users. Therefore in the case, the EMBL is placed with a noise estimation based EMBL location optimization.

Figure 15:
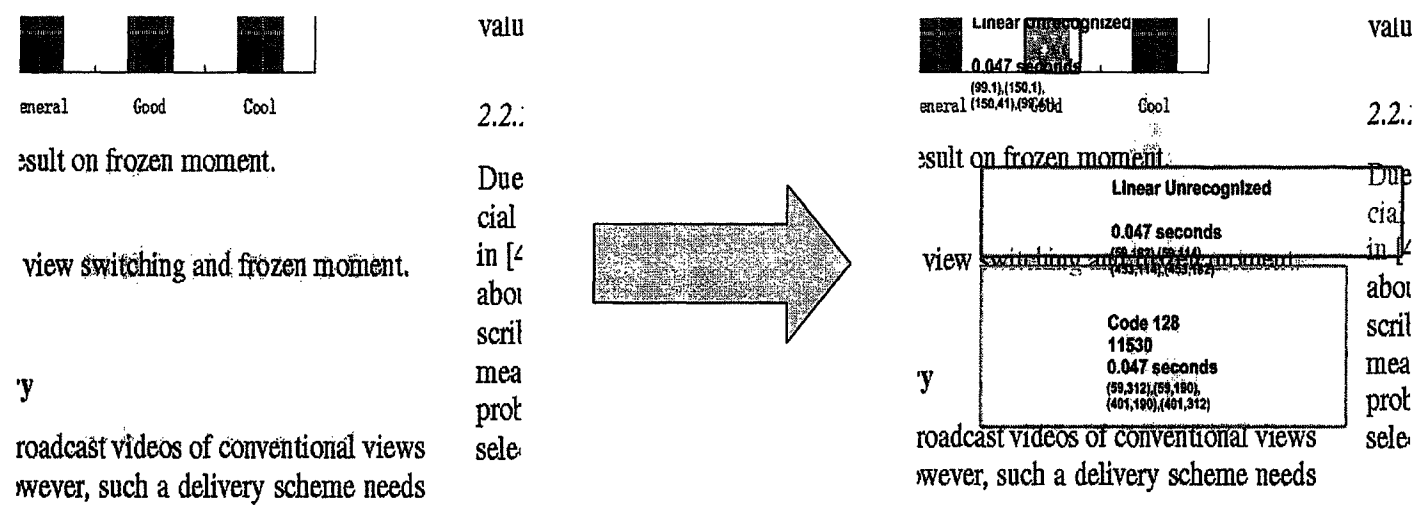

With a noise estimation based EMBL location optimization, the algorithm finds an EMBL mixing location that only requires a 0.1523 barcode blending coefficient. The result of this optimization is shown in FIG. 15. In FIG. 15, the EMBL is moved to a location with less noise (vertical edges of contents) for a lighter blending. This result verifies the EMBL location optimization idea.

EMBL Experiment with Real Captures

Figure 16:
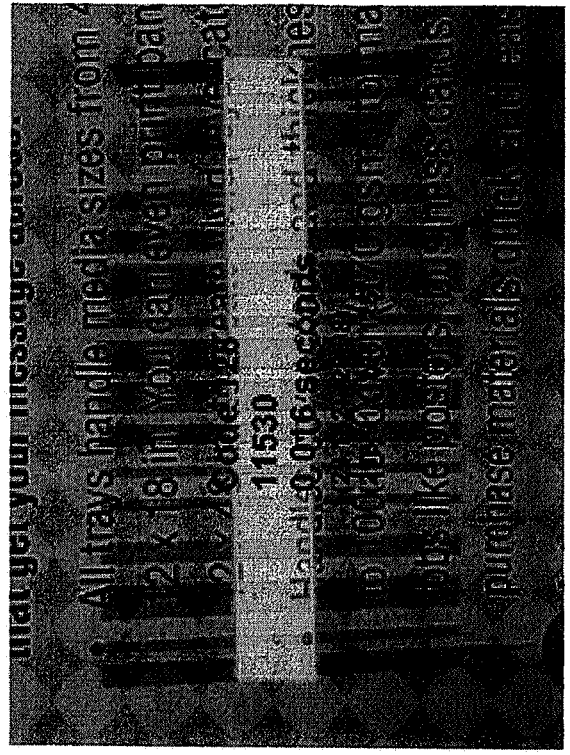
FIGS. 16(a) and 16(b) illustrate identification of the barcode in a barcode-mixture and photo setting.

Besides the systematic testing of optimal blending coefficient distribution in different channels, various EMBLs were also tested in different virtual or real environments. FIG. 16 (a) shows the identification result of a barcode-content mixture. Because the original file of a mixed patch is sent to a barcode decoder, there is no capture noise involved in this decoding. To make EMBL robust to capture noise, the real EMBL printing usually uses a slightly larger blending coefficient. FIG. 16 (b) shows the EMBL identification in a real photo which was captured with a 640 by 480 pixel camera under normal office lighting. From the figure, a little perspective distortion and uneven surface caused distortion can be observed. It seems that these distortions didn't have much impact to barcode identification process.

An EMBL can also be made into known form curves or other geometric forms instead of barcode form. FIG. 17 is an example of such an EMBL. In this example, a 1D profile of a code-128 barcode is used to generate some concentric circles as shown in FIG. 17(a). Then, an algorithm to find a feature sparse spot for the circular EMBL is used. After the circle center is roughly located during capture, the captured image can be transformed to radius-angle domain for barcode identification as shown in FIG. 17(b). This type of EMBL does not need very accurate and computationally expensive circle center localization. When the circle center is located very accurately, the transformed image will have a series of straight lines to represent the barcode. If the circle center is not accurately located, the transformed image will have a series of curves instead of straight lines. These curves can normally be recognized by a decoder. If the curves' curvatures are large, we can use multiple image profiles to generate multiple submissions to a decoder and use a voting approach to finalize the decoded data. Other geometric forms are also possible; the barcode merely needs to be transformed to a proper geometric form dependent domain in order to be distributed correctly within the EMBL.

Figure 18:
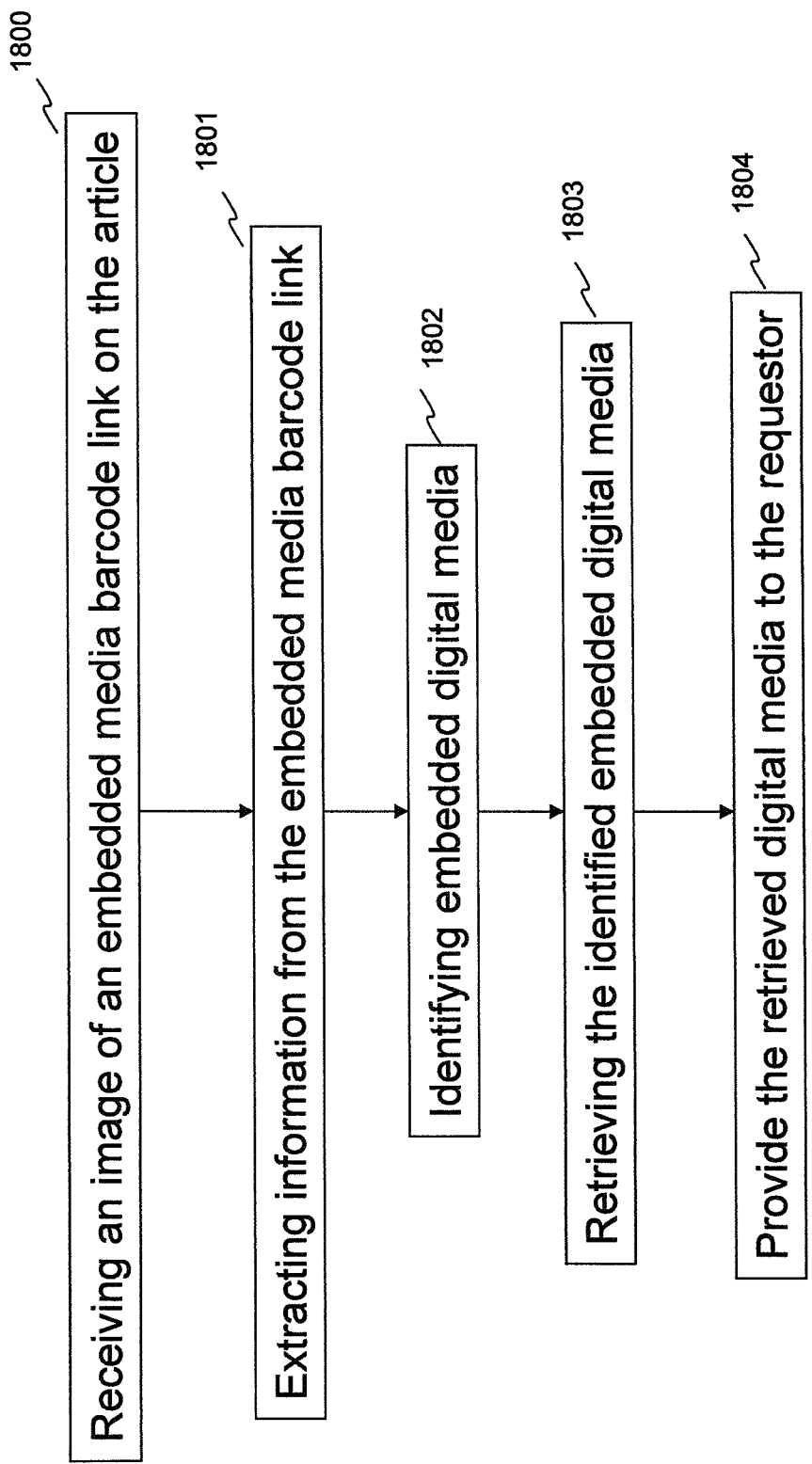
FIG. 18 is a flow chart that illustrates a method for providing a digital medium by making use of a database and an article according to one of the embodiments of the invention.

FIG. 18 is an example flow chart of a computer-implemented method for providing a digital medium according to an embodiment of the invention. First, an image of an embedded media barcode link on the article is received 1800. Next, information from the embedded media barcode link is extracted 1801. Subsequently, embedded digital media corresponding to the extracted information is identified 1802, upon which the identified embedded digital media is retrieved 1803 and then provided 1804.

Figure 19:
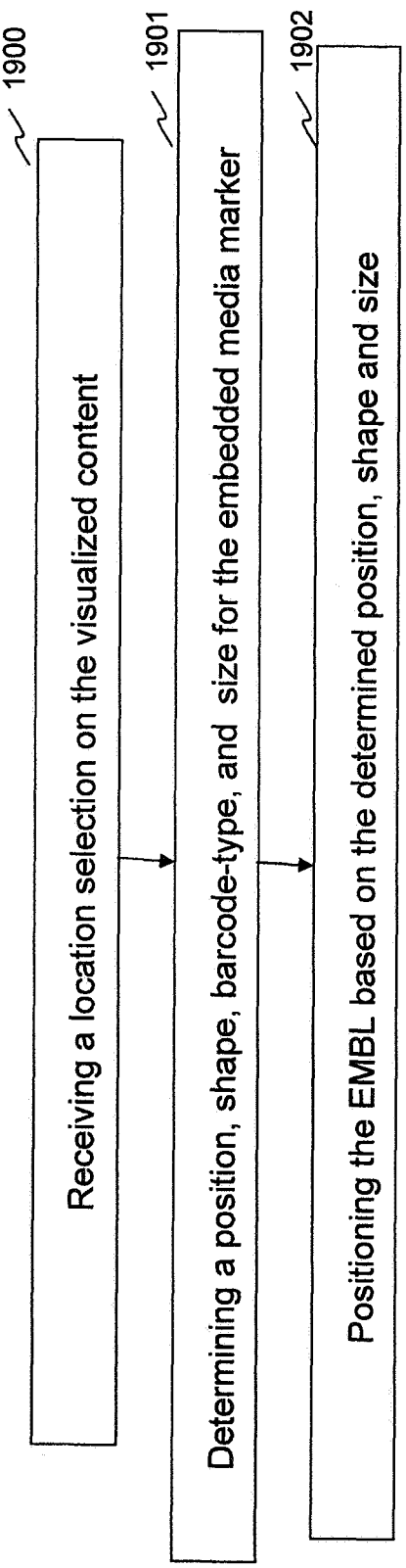
FIG. 19 is a flow chart that illustrates a method of producing an article including a visualized content and an embedded media marker on the content.

FIG. 19 illustrates an example flow chart for producing an embedded media barcode link. First, the system receives a location selection of the visualized content 1900. From the selection, a position and size is determined for the EMBL 1901. Subsequently, the EMBL is positioned based on the determined position and size 1902.

Figure 20:
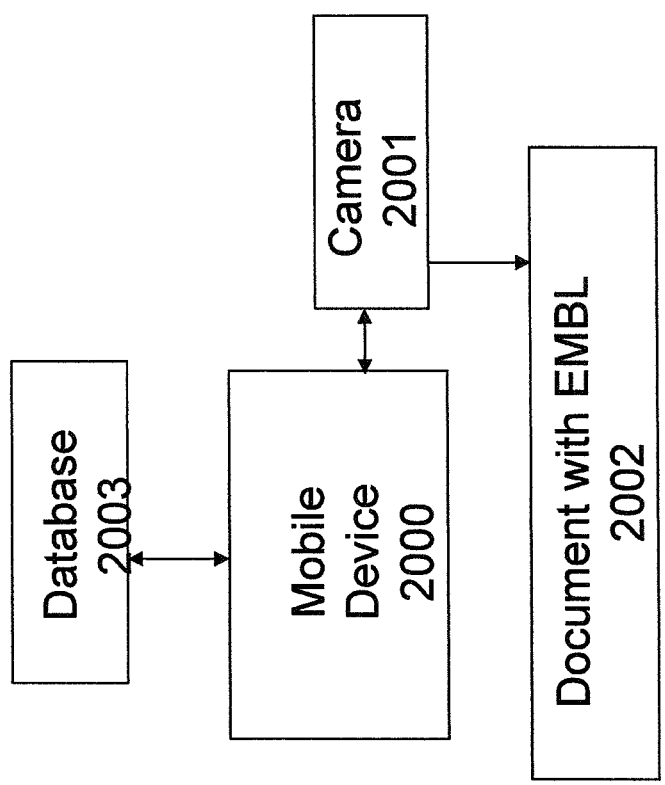
FIG. 20 illustrates an example a functional diagram of a system according to an embodiment of the invention.

FIG. 20 illustrates an example functional diagram of the system. A mobile device 2000 with a camera 2001 focuses onto a document that contains an EMBL 2002, and provides feedback to the mobile device. Upon the detection of an EMBL, the mobile device references a database 2003 to determine the type of content the EMBL is referenced to. The database returns information back to the mobile device, and the mobile device may then execute the content.

Figure 21:
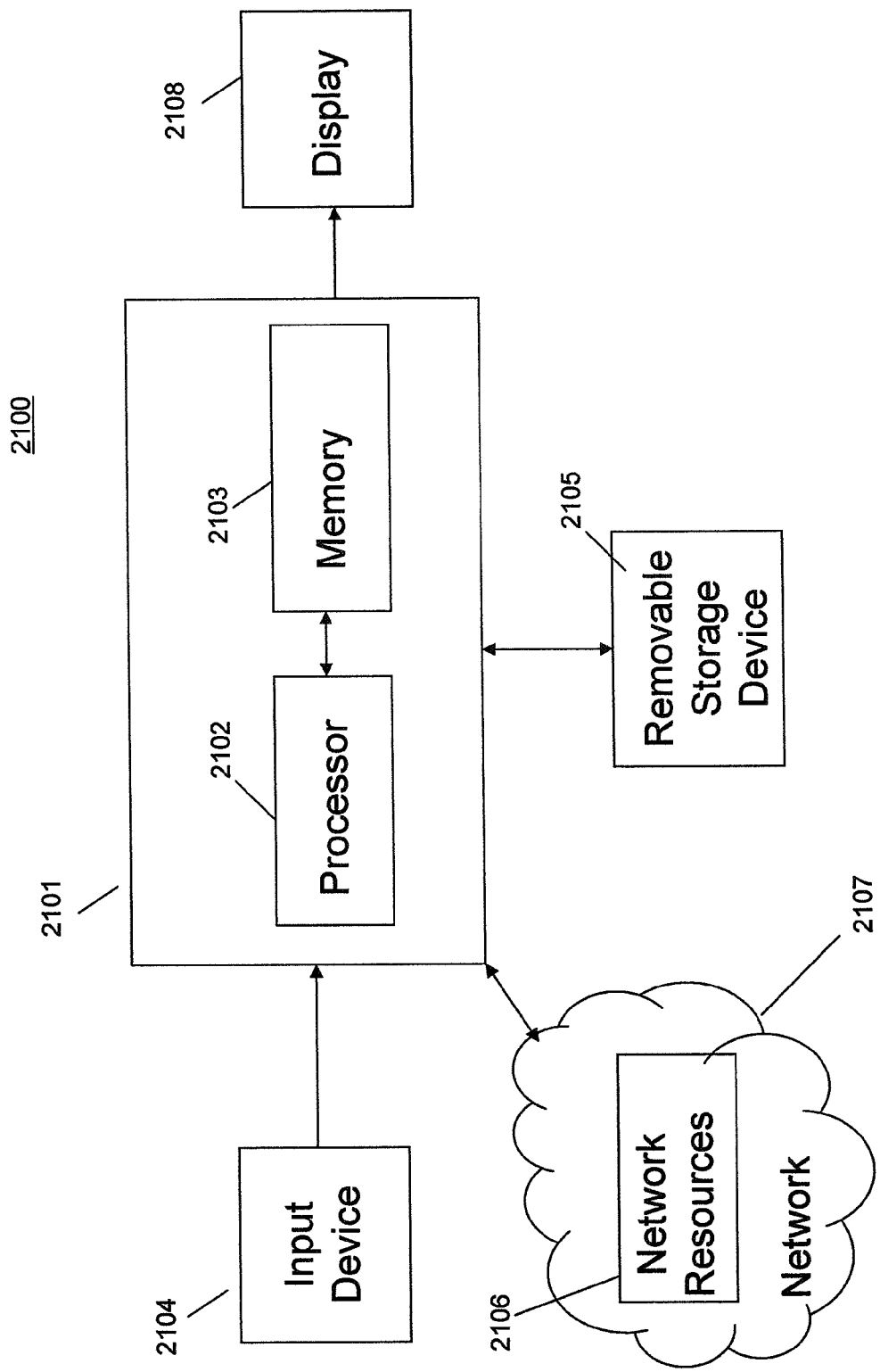
FIG. 21 illustrates an exemplary embodiment, such as a mobile platform, upon which the inventive system may be implemented.

FIG. 21 is a block diagram that illustrates an embodiment of a computer/server system 2100 upon which an embodiment of the inventive methodology may be implemented. The system 2100 includes a computer/server platform 2101 including a processor 2102 and memory 2103 which operate to execute instructions, as known to one of skill in the art. The term "computer-readable medium" as used herein refers to any medium that participates in providing instructions to processor 2102 for execution. Additionally, the computer platform 2101 receives input from a plurality of input devices 2104, such as a keyboard, mouse, touch device or verbal command. The computer platform 2101 may additionally be connected to a removable storage device 2105, such as a portable hard drive, optical media (CD or DVD), disk media or any other medium from which a computer can read executable code. The computer platform may further be connected to network resources 2106 which connect to the Internet or other components of a local public or private network. The network resources 2106 may provide instructions and data to the computer platform from a remote location on a network 2107. The connections to the network resources 2106 may be via wireless protocols, such as the 802.11 standards, Bluetooth® or cellular protocols, or via physical transmission media, such as cables or fiber optics. The network resources may include storage devices for storing data and executable instructions at a location separate from the computer platform 2101. The computer interacts with a display 2108 to output data and other information to a user, as well as to request additional instructions and input from the user. The display 2108 may therefore further act as an input device 2104 for interacting with a user.

Moreover, other implementations of the invention will be apparent to those skilled in the art from consideration of the specification and practice of the invention disclosed herein. Various aspects and/or components of the described embodiments may be used singly or in any combination in the embedded media barcode link system. It is intended that the specification and examples be considered as exemplary only, with a true scope and spirit of the invention being indicated by the following claims.

What is claimed is:

1. A computer-implemented method for providing a digital medium by making use of an embedded media barcode link and an article, the embedded media barcode link comprising a barcode, the method comprising:
a. receiving an image of an embedded media barcode link on the article;
b. extracting information from the embedded media barcode link;
c. identifying embedded digital media corresponding to the extracted information; and
d. retrieving the identified embedded digital media;
wherein the embedded media barcode link further comprises a media-type icon representing the type of media of the embedded digital media.

2. The computer-implemented method of claim 1, wherein the media-type icon is disposed within the barcode, and alpha-blended into the barcode.

3. The computer-implemented method of claim 2, further comprising determining an appropriate position, shape, size and type of barcode for the embedded media barcode link and alpha blending the embedded media barcode link into the article.

4. The computer-implemented method of claim 1, wherein the barcode is shaped and distributed within the media-type icon.

5. The computer-implemented method of claim 1, wherein the barcode comprises database address information for the embedded digital media.

6. An article comprising:
a. content visualized on a surface of the article;
b. an embedded media barcode link blending the visualized content, the embedded media barcode link comprising a barcode; and
c. an embedded digital media object corresponding to the embedded media barcode link, the embedded digital media object being stored in a database.

7. The article of claim 6, wherein the article is a two dimensional surface medium.

8. The article of claim 6, wherein the embedded media barcode link is positioned, shaped, sized, type-adjusted for a barcode type and alpha-blended with the visualized content of the article.

9. The article of claim 6, wherein the embedded media barcode link further comprises a media-type icon disposed within the barcode, the media-type icon representing the type of media of the embedded digital media, the media-type icon being positioned, shaped, sized, type-adjusted and alpha-blended into the barcode.

10. The article of claim 6, wherein the embedded media barcode link further comprises a media-type icon, the media-type icon representing the type of media of the embedded digital media, the barcode being shaped and distributed within the media-type icon.

11. The article of claim 6, wherein the barcode comprises information linking to the embedded digital media object in the database.

12. The article of claim 6, wherein the barcode is transformed to a proper geometric form dependent domain, and wherein the transformed barcode is distributed within the embedded media barcode link.

13. The article of claim 12, wherein the embedded media barcode link further comprises an indication for either the center of the media type icon, an anchor point, an orientation, or a size of a geometry shape.

14. A computer-implemented method for producing an article including visualized content and an embedded media barcode link on the content, the embedded media barcode link comprising a barcode, the method comprising:
a. receiving a selection of a location on the visualized content of the article;
b. determining a position, a shape, a barcode-type and a size of the embedded media barcode link based on a quantity of a plurality of features of the visualized content near the selected location within the embedded media barcode link; and
c. positioning the embedded media barcode link on the article based on the determined position, shape, barcode-type and size, wherein the embedded media barcode link indicates availability of a digital media object associated with the location within the visualized content.

15. The computer-implemented method of claim 14, wherein the embedded media barcode link further comprises a media-type indicator comprising a media-type icon, wherein the media-type indicator is disposed within the barcode, wherein the media-type icon is properly positioned, shaped, sized, type-adjusted for the barcode type and alpha blended into the barcode.

16. The computer-implemented method of claim 14, further comprising alpha-blending of the embedded media barcode link with the visualized content of the article.

17. The computer-implemented method of claim 14, wherein the embedded media barcode link further comprises a media-type icon, the media-type icon representing the type of media of the embedded digital media, the barcode being positioned, sized, type-adjusted for the barcode type and shaped and distributed within the media-type icon.

18. The computer-implemented method of claim 17, further comprising transforming the barcode to a proper domain based on a geometry form of the media-type icon and distributing the transformed barcode with the media-type icon.

19. The computer-implemented method of claim 16, wherein the alpha-blending utilizes a blending coefficient, the blending coefficient being determined by the estimation of noise in relation to the positioning of the embedded media barcode link.

20. The computer-implemented method of claim 14, wherein the positioning the embedded media barcode link on the article further comprises identifying a patch with a lowest noise around the selected location and utilizing a patch with a best blending coefficient.

* * * * *